United States Patent Office 3,810,964
Patented May 14, 1974

3,810,964
PROCESS FOR EXTRUDING A FOAMED CLOSED-CELL POLYOLEFIN EXTRUDATE SUBSTANTIALLY FREE FROM CELL COLLAPSE BY USE OF A BARRIER MATERIAL
Herbert A. Ehrenfreund, Madison, Conn., assignor to Polytech Systems, Inc., Madison, Conn.
No Drawing. Continuation-in-part of application Ser. No. 39,158, May 20, 1970. This application Sept. 20, 1971, Ser. No. 182,268
Int. Cl. B29d 27/00; C08f 29/12
U.S. Cl. 264—53      4 Claims

ABSTRACT OF THE DISCLOSURE

Preparation of a polyolefin foam by extruding a combination of materials including a chemically inert, particulate nucleation system, an expanding agent together with petroleum naptha which promotes foaming in a low pressure ambient, an ionomer, and a barrier material of high melt strength which improves the properties of the polymer and also serves during foaming as a blocking mechanism against post-extrusion cell collapse.

---

This application is a continuation-in-part of application Ser. No. 39,158, filed May 20, 1970 and now abandoned.

BACKGROUND

In the manufacture of polyolefin foam, such as low density polyethylene foam, a normally liquid or gaseous propellant is mixed with a hot molten polymer under pressure in an extruder, and the material cooled to a temperature near the freezing point of the polyolefin. The material issues from the extruder orifice with a release of pressure on the expanding agent; cells originate and grow to form a cellular polymeric structure. Control of extrusion temperature, cooling time and the pressure generated by the expanded agent during foaming reactions are critical factors, since crystallizing polymers, such as polyethylene, are highly exothermic during the foaming and freezing process. Moreover, such foam materials are characterized by a closed cell structure in which the cell walls are permeable to the rapidly expanding gas under the influence of the heat liberated by polymer crystallization. As a result, rupture and total collapse of the cell walls frequently occurs whereby the cellular structure of the resulting foam has limited commercial application. For example, one important application of these foam materials involves their ability to withstand shock, such as in cushion-like applications, including packaging material, pallet legs, marine flotation, and furniture cushion material. Obviously, cell collapse is a serious drawback to the use of polyolefin foams for such applications.

This problem has been recognized in recent years and various solutions have been proposed to overcome the problem. In this connection the Sneary Pat. No. 3,102,865 discloses the use of alkanols as a "heat sink" for absorbing excessive heat generated during crystallization of thermoplastic material.

The Moody Pat. No. 3,344,221 also relates to the problems involved in manufacture of polymeric cellular structures having closed cells, and in particular relates to a process for achieving changes in the density of such foams. The use of polyethylene terephthalate as a barrier material is suggested as a means of reducing the permeability rate of the polymer to the expanding agent, trichlorotrifluoroethane.

The principal object of this invention is to provide an improved method of foaming polyolefin materials, including branched chain polyethylene, linear polyethylene and polypropylene.

It is another object to this invention to provide a improved monolefin foam containing an ionomer and a barrier material or blocking agent which prevents gas migration through the cell walls as the foam is being generated.

The above and other objects of this invention will be more apparent from the following description and claims.

This invention relates to the manufacture of polyolefin foam from a mixture or blend of thermoplastic materials including low and high density polyethylene and polypropylene, a normally gaseous propellant or expanding agent such as "Freon 12" or a mixture of "Freon 12" dichlorodifluoromethane ($CCl_2F_2$) and "Freon 22" monochlorodifluoromethane ($CHClF_2$) having substantially different vapor pressures and solubility in the polymer blend. The mixture of Freon 12 and 22 is preferably for use in efficiently making low density foams of the 1–3 lbs. per cu. ft. range. For example, at a die temperature of about 200° F., Freon 12 has a solubility in polyethylene (Alathon 16—Registered Trademark of E. I. du Pont DeNemours Co.) of about 26 phr. and Freon 22 has a solubility of about 14 phr. in the same polymer. The vapor pressure developed by these two expanding agents at the same temperature (200° F.) is between 85 and 210 p.s.i. for 1 to 3 phr. for Freon 22 and 110–150 p.s.i. for 1 to 2 phr. for Freon 12.

A mixture of 1–2 phr. of Freon 22 and 3–4 phr. of Freon 12 in an amount of less than 8% by weight to the foamable mixture has been found to be unusually well adapted for use in foaming polyethylene because quite small quantities of Freon 22 can be used to develop adequate vapor pressure for proper foam generation at the freezing point (203° F.) of polyethylene. The use of Freon 22 because of its initially high vapor pressure enables attainment of lower foam densities 1–3 lbs. cu. ft. and fine cellular structure.

Although Freon 22 has a relatively low solubility in polyethylene, it is soluble in Freon 12 which has approximately twice the solubility in polyethylene as Freon 22. Therefore, when these two propellants are combined the problem of propellant solubility is overcome. Moreover, this combination of propellants provides a system with a relatively wide range of vapor pressures so that only a small quantity is required to provide adequate vapor pressure for development of superior foam structures.

To the polyolefin and ionomer, such as "Surlyn" AD-8071 (produced by E. I. du Pont DeNemours Co.) is added 1–20% by weight related to the quantity of polyolefin of a barrier material selected from the group consisting of acrylic polymers, including acrylic esters and impact styrene. These barrier materials are added as polymer enhancers to increase the tensile strength and handling properties of the foam and to inhibit escape of the rapidly expanding propellant as the polymer blend issues from the extruder die. The ionomer when combined with the acrylic-polyethylene foam provides a material of unusually high tear strength, resistance to cold flow, and is characterized by unusually low compression set at room temperature. Sorbitan trioleate, monomid (alkylolamides) sorbitan monostearate, or glycol monostearate, or combinations of these polymers or compounds and naptha may preferably be added in small quantities to the foamable mixture as lubricants to facilitate polymer flow through the extrusion die. As there are no crystals in the melt, and since the propellant combination is dissolved in the amorphous phase and not the crystalline phase of the polymer, it is beneficial to accelerate the formation of crystals during extrusion foaming to bring about propellant expansion with consequent rapid growth of foam cells. Nucleants such as talc, chalk dust or other suitable chemically inert material may also be used. With use of one or more of these enhancers or barrier materials, it has been found that Freon 12 may alone be used as the expanding agent for the foam.

At the polymer extrusion temperature of 200–205 F., the exotherm of crystallinity promotes rapid expansion of Freon 12. Ordinarily there would be pronounced migration of the propellant through the cell walls, however, the added barrier material, which may be an acrylic resin, including an acrylic ester, or impact styrene, imparts high melt strength to the cell wall at these tempeatures and acts as a gas barrier to substantially reduce gas migration through the forming cell walls, thus preventing post-extrusion foam cell collapse.

In an extruder with a heating zone, gas injection zone, and a mixing and cooling zone, a mixture of 100 parts by weight of .918, melt index of 2.0 density of branched chain polyethylene, 1 part ionomer, .25 lb. zinc stearate, .2 lb. calcium silicate were fed at the rate of 300 lbs./hr. Freon 12 was injected into the extruder at the rate of 4 phr., naptha was injected at the rate of 1 phr. Extruder operating conditions were as follows:

| (Feed) Zone 1 | Zone 2 | (Injection) Zone 3 | Zone 4 |
|---|---|---|---|
| 470° F | 410° F | 350° F | 112° F |

The mixture was extruded through a ½" round orifice die and foamed to rod diameter of 4", and promptly collapsed to a diameter of 2⅝" with a wrinkled surface.

The above run was duplicated with the exception that 1% by weight of acrylic resin (American Cyanamid BH 111) was added with the polymer feed stock. The foam product was again extruded to a 4" diameter rod but this time retained its dimensional stability indefinitely.

When using acrylic resin as a barrier material or impact polystyrene for making polyolefin foam, the acrylic resin or impact polystyrene and polyolefin are more readily combined in solution when a small amount of ionomer up to 3% by weight of oplyolefin is added.

By the method herein disclosed, I have overcome the necessity of employing irradiation or chemical addition in order to cross link the polymer and thus enhance its wet strength and ability to withstand propellant migration. For example, this method overcomes the critical control required when cross linking to obtain proper foaming action and cell formation. Moreover, with the method of this invention the polymer can be recovered and reused by melting down, whereas when cross linking has been carried out this is not feasible. The addition of an acrylic barrier material not only serves to prevent post-extrusion cell collapse but also serves to improve physical properties of the foam, particularly its cold flow resistance and weatherability.

Thus my invention provides a polymer blend used with a combination of polymeric materials, including enhancers whereby I am able to achieve improved foaming action with good overall cell formation and enhanced polymer foam properties in the end product. For example, with a blend of polymers such as herein disclosed, the resulting polymer foam combination has improved mechanical properties including low comperssion set, high tensile and impact strength and excellent cold flow properties.

Having thus described the invention, what is claimed is:

1. Method of extruding a closed cell polyolefin foamed article, comprising blending with a molten polyolefin resin, a particulate nucleating agent and at least one normally gaseous fluorocarbon propellant, and 1–20% of a barrier material for blocking gas migration through the cell walls as the foam is being generated, and the barrier material being selected from the group consisting of acrylic resin, and impact styrene and then extruding said blend to form a foamed closed cell polyolefin extrudate substantially free from cell collapse and which has enhanced strength and resistance to cold flow.

2. Method of extruding a closed cell foamed article as set forth in claim 1 in which polyolefin is polyethylene and in which an ionomer is added to the blend.

3. Method of extruding closed cell foamed article as set forth in claim 2 in whih said gaseous propellant comprises dichlorodifluoromethane and monochlorodifluoromethane.

4. Method of extruding closed cell foam article as set forth in claim 2 in which said barrier material is an acrylic resin.

References Cited
UNITED STATES PATENTS

| | | | |
|---|---|---|---|
| 3,102,865 | 9/1963 | Sneary et al. | 264—Dig. 16 |
| 3,379,802 | 4/1968 | Raley et al. | 264—53 |
| 3,474,050 | 10/1969 | Chappelbar et al. | 264—53 XR |
| 3,644,230 | 2/1972 | Cronin | 260—2.5 E |
| 3,657,165 | 4/1972 | Kawai et al. | 260—2.5 B |
| 3,413,244 | 11/1968 | Landler et al. | 264—Dig. 18 |
| 3,520,834 | 7/1970 | Mizutani et al. | 260—2.5 B |

PHILIP E. ANDERSON, Primary Examiner

U.S. Cl. X.R.

260—2.5 E, 2.5 HA, 2.5 HB, 897 B, 901; 264—176 R, Dig. 5